A. KIRLIN.
Check-Row.

No. 25,833. Patented Oct. 18, 1859.

Witnesses:
T. H. Doughty
G. H. Warns

Inventor:
A. Kirlin

UNITED STATES PATENT OFFICE.

A. KIRLIN, OF NEW BOSTON, ILLINOIS.

IMPROVEMENT IN CORN-PLANTERS.

Specification forming part of Letters Patent No. 25,833, dated October 18, 1859.

*To all whom it may concern:*

Be it known that I, A. KIRLIN, of New Boston, in the county of Mercer and State of Illinois, have invented certain new and useful Improvements in Corn-Planters; and I do hereby declare that the following is a full, clear, and exact description of the same, reference being had to the accompanying drawings, and to the letters of reference marked thereon, in which—

Figure 1:
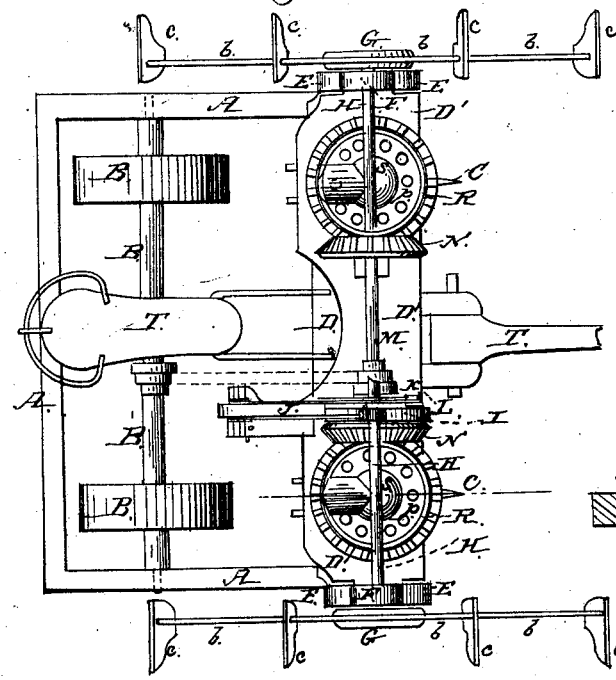
Figure 3:
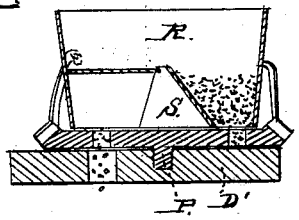
Figure 2:
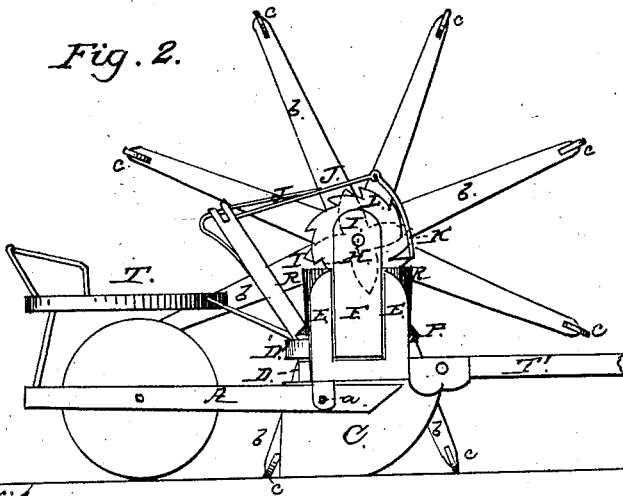

Figure 1 represents a plan view of my machine, showing the several parts in position for operation. Fig. 2 is an elevation of the machine with one of the side wheels removed. Fig. 3 is a vertical middle section taken through one of the hoppers, showing the conical bottom and the mode of dropping the seed.

My invention consists in arranging on each side of the machine the markers for spacing the ground as the machine proceeds forward, and upon the shaft of these markers a cam, which, by a peculiar arrangement, the corn is dropped from the hoppers at desired intervals as the markers rotate.

A represents a frame supported by driving-wheels B B upon shaft B', and having shoes C C in its front end, with two wings projecting out from their rear part, between which the corn to be planted drops. These are supported by a cross-piece, D, extending across the front part of the frame, and hinged to its sides at *a*, so as to allow the piece D a slight vibration. From either end of this cross-support D proceed up vertical posts E E, and between these are standards F F, connected to a piece, D', resting upon the cross-support D, which supports the machinery for planting.

G G are two wheels fixed to and operating the shaft H, which has its bearings in the standards F F. These wheels have radial arms *b b*, carrying on their ends small shovels *c c*, which, as the machine is propelled forward, strike the ground at regular intervals and mark where the corn has been deposited when it is sown in hills. This wheel not only check-rows the deposited corn, but serves at the same time for operating the dropping apparatus, so that the corn is regularly and accurately marked. This is effected as follows:

On the shaft H of the markers or wheels G G is a rose-cam, I, having four spurs, which alternately raise and lower the spring-arm J, and with it a hooded pawl, K, operating a ratchet-wheel, L, which is fixed to a shaft, M, supported by standards, and carrying on either end beveled spur-wheels N N. By this arrangement at each stride of the radial arms of markers G G the beveled wheels N N are turned a certain distance; and as these wheels mesh into the spurs cast on the rotary bottoms P P of the fixed hoppers R R a motion corresponding to that imparted to the spur-wheels N N is communicated to these bottoms. The hoppers R R are suspended upon legs over the rotary bottoms P P, and brought sufficiently close to these bottoms to prevent the seed from falling out.

In the center of each hopper, as clearly shown by Fig. 3, is a cone, S, the sides of which are inclined, so as to feed all the seed contained in the hoppers to the seed-cups *e e*. The seed is then discharged from these cups down and between the wings of the shoes C C into the drill, when sowing in drills, and are covered and the earth pressed down by the driving-wheels B B, which follow in a line with the drill formed by the shoes. On the shafts B' M are cone-pulleys *f f*, which, by means of a connecting-belt, (shown in red lines, Fig. 1,) the hopper-bottoms can be given any desired speed when planting in drills; and by means of a clutch upon one of the shafts the cone-pulley can be thrown out, so as to stop the motion of the planting apparatus.

The driver sits astride of the seat T and manages the horses, which are attached to the pole T'.

What I claim as my invention, and desire to secure by Letters Patent, is—

The cam I, spring-arm J, ratchet and pawl K L, when the same are arranged as set forth, and operated by the marker-wheels G G for giving motion to the rotary hopper-bottoms for planting the corn, as hereinbefore described.

A. KIRLIN.

Witnesses:
T. H. DOUGHTY,
G. W. WARNER.